Figure 1:
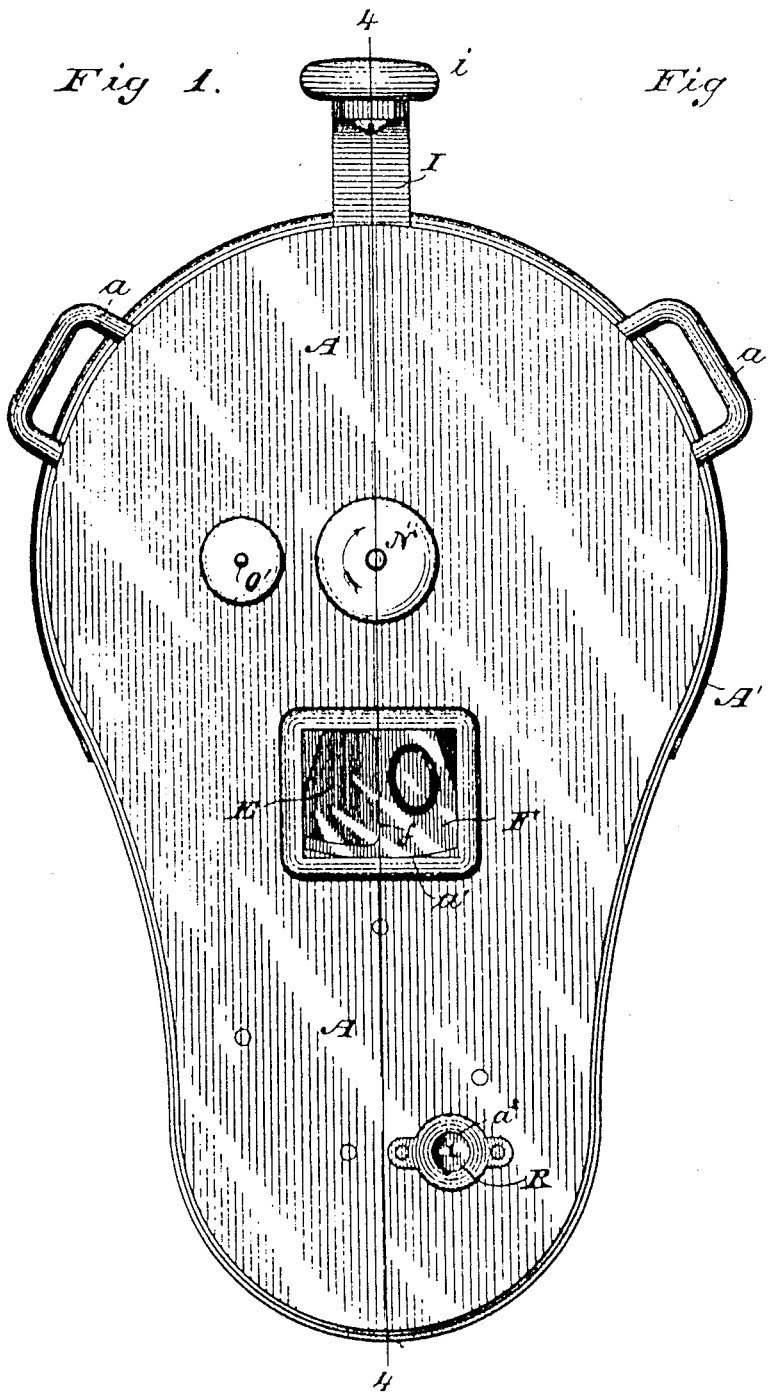

J. B. BENTON.
Fare Register.

No. 229,662. Patented July 6, 1880.

5 Sheets—Sheet 1.

WITNESSES
Wm A. Skinkle
Geo W Breck

INVENTOR
John B Benton.
By his Attorneys
Baldwin Hopkins & Peyton

J. B. BENTON.
Fare Register.

No. 229,662. Patented July 6, 1880.

5 Sheets—Sheet 2.

WITNESSES
Wm A Skinkle
Geo N Breck

INVENTOR
John B Benton
By his Attorneys
Baldwin Hopkins & Peyton

J. B. BENTON.
Fare Register.

No. 229,662.          Patented July 6, 1880.

WITNESSES
Wm A Skinkle
Geo W Breck

INVENTOR
John B Benton

By his Attorneys
Baldwin Hopkins & Peyton

J. B. BENTON.
Fare Register.

No. 229,662. Patented July 6, 1880.

WITNESSES
Wm A Skinkle
Geo W Breck

INVENTOR
John B Benton
By his Attorneys
Baldwin Hopkins & Peyton

5 Sheets—Sheet 5.

J. B. BENTON.
Fare Register.

No. 229,662. Patented July 6, 1880.

WITNESSES
Wm A Skinkle
Geo W Beck

INVENTOR
John B. Benton.

By his Attorneys
Baldwin Hopkins & Peyton

UNITED STATES PATENT OFFICE.

JOHN B. BENTON, OF NEW YORK, ASSIGNOR TO THE RAILWAY REGISTER MANUFACTURING COMPANY, OF BUFFALO, N. Y.

FARE-REGISTER.

SPECIFICATION forming part of Letters Patent No. 229,662, dated July 6, 1880.

Application filed February 12, 1879.

*To all whom it may concern:*

Be it known that I, JOHN B. BENTON, of the city, county, and State of New York, have invented certain new and useful Improvements in Fare-Registers, of which the following is a specification.

My invention relates to portable registers, more especially designed for the use of conductors upon railroads and receivers of fares on passenger vehicles or conveyances generally, whereby a check is put upon the conductor or collector to prevent dishonest practices and false returns of collections made by compelling him to register each fare as collected and indicate the registry by sounding an alarm.

The invention belongs more particularly to registers of that class having mechanism for permanently recording the whole number of fares collected, mechanism for temporarily registering the fares collected on each trip or direction of travel of the car or vehicle, and capable of being set to "zero," or the point indicative of no registry, at the end of each trip without interfering with the permanent record, which preserves with integrity the continuous record of a great number of fares, and mechanism for sounding an alarm.

The object of my invention is to furnish an improved fare-register of the class above recited, the same constituting an improvement upon the mechanism shown in reissued Letters Patent of the United States No. 7,290, granted September 5, 1876, to Hamilton E. Towle and myself, jointly, and in Letters Patent of the United States No. 167,057, granted to me August 24, 1875.

The first part of my invention consists in combining mechanism for permanently recording each fare as collected, mechanism for indicating the fares collected on each trip, alarm mechanism, and an actuator, slide, or push-bar provided with pivoted spring actuating-pawls, one for each registering mechanism and for the alarm apparatus, whereby one prime mover actuates each registering mechanism and the alarm by independent pawl-connections.

My invention further consists in combining mechanism for permanently registering each fare as collected, mechanism for indicating the fares collected on each trip, alarm mechanism, an actuator, slide, or push-bar provided with pivoted spring actuating-pawls, one each for the registering mechanisms and for the alarm, and mechanism for registering each time the trip-register is brought to zero or the starting-point.

The accompanying drawings represent my present improvements as embodied in the best way now known to me. The details of construction and organization, however, may be varied without departing from the spirit of my invention.

Figure 2:
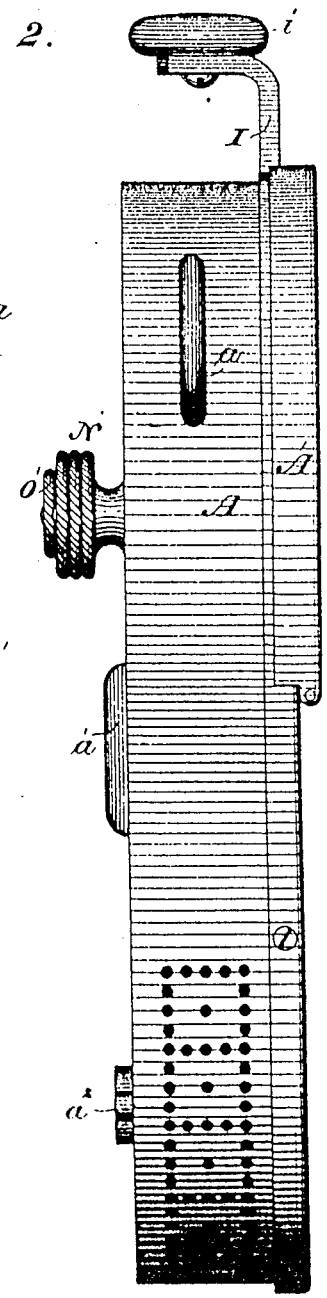
Figure 3:
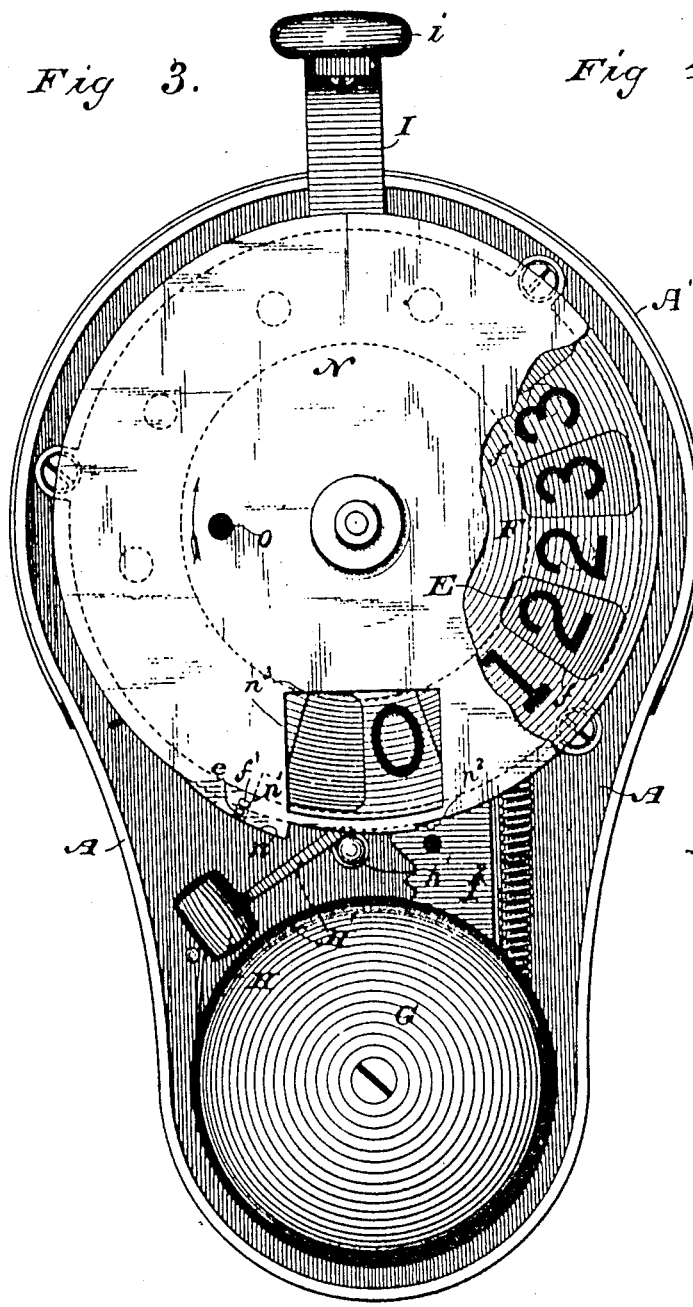
Figure 4:
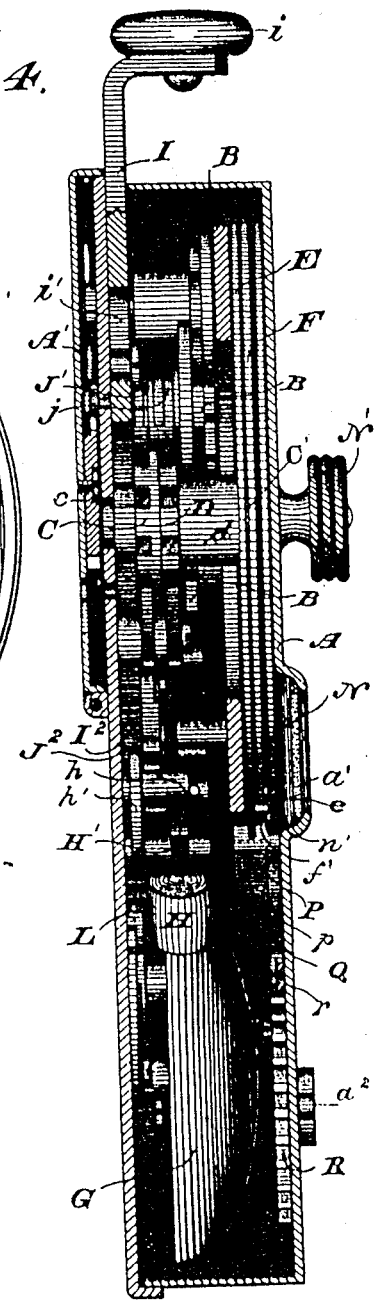
Figure 5:
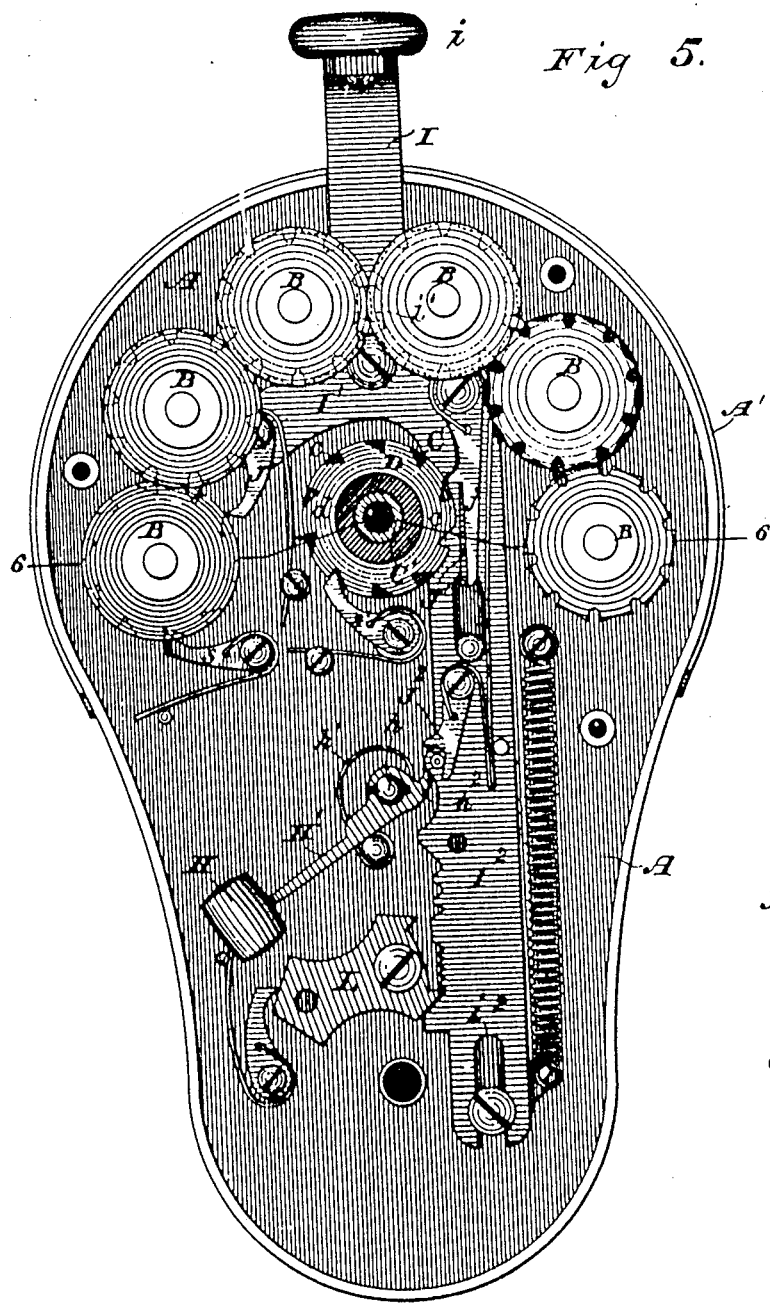
Figure 6:
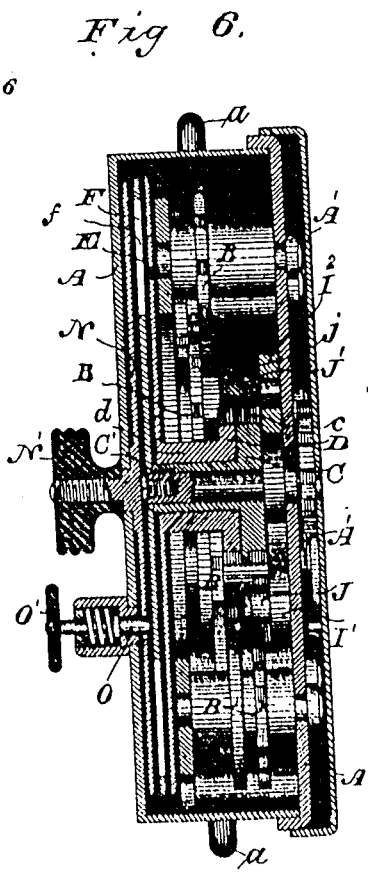
Figure 7:
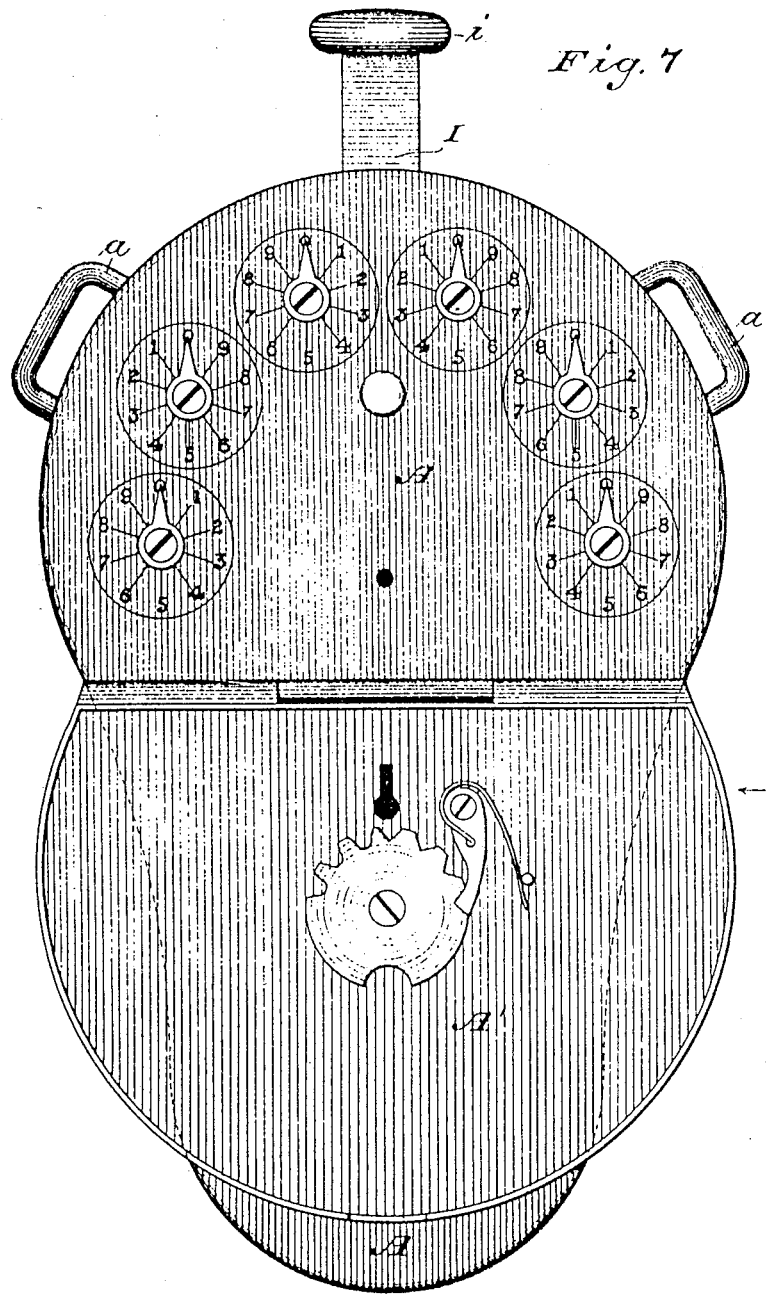
Figure 8:
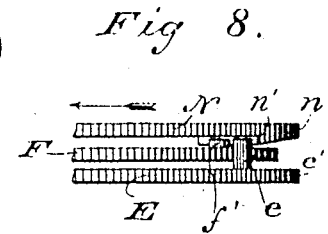
Figure 9:
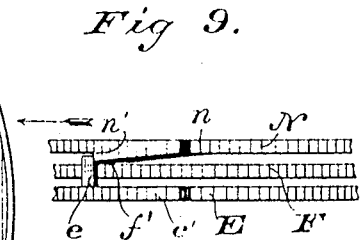
Figures 10, 11:
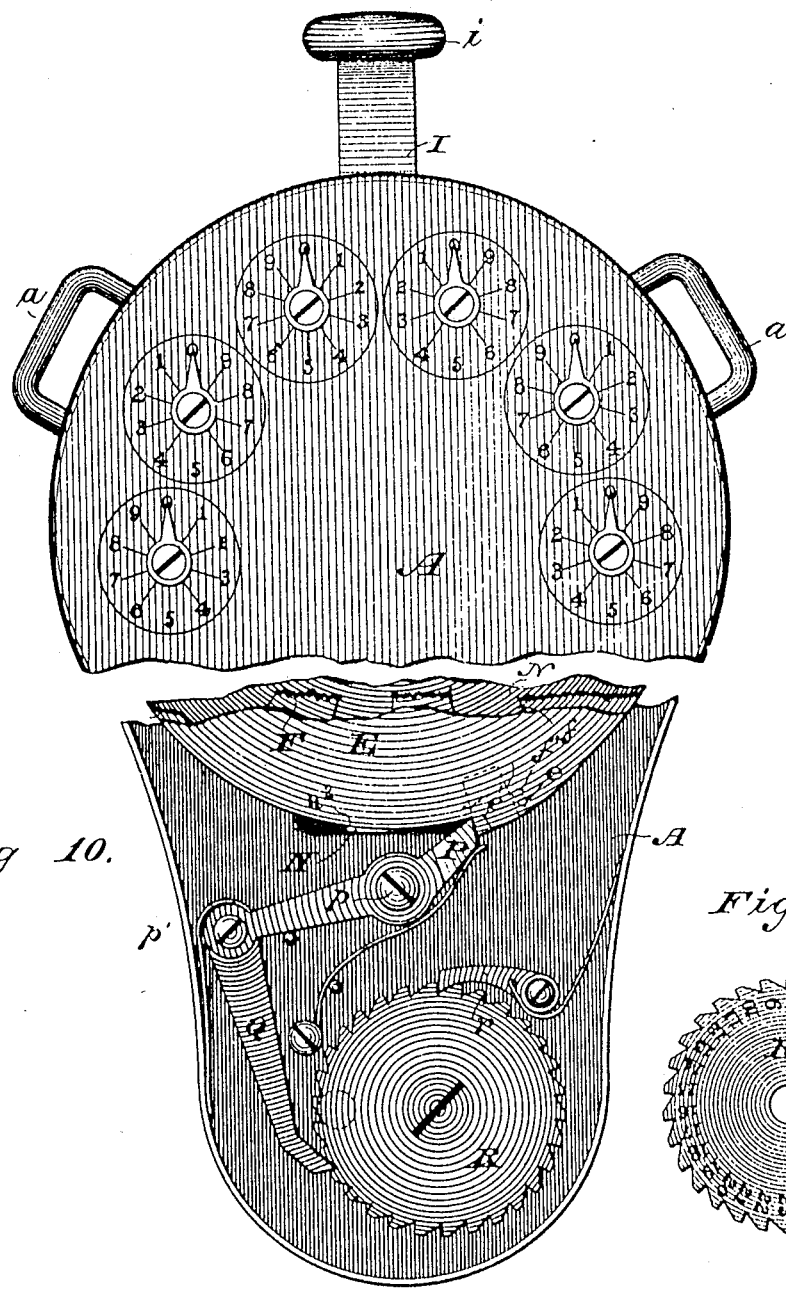

Figure 1 represents a front view of my improved register; Fig. 2, a side view thereof; Fig. 3, a front view with the cover detached, the turning-plate by which the trip-register is brought to zero being shown as partly broken away; Fig. 4, a longitudinal central section through the apparatus on the line 4 4 of Fig. 1; Fig. 5, a front view of the internal parts of the register, the trip-registering disks or wheels, the turning-plate, and the cover or casing being removed; Fig. 6, a transverse section through the apparatus on the line 6 6 of Fig. 5; Fig. 7, a view of the back of the register, the hinged cover of the permanent-register dials being thrown back. Figs. 8 and 9 are detached views of portions of the trip-register disks or dials and the turning-plate, showing the engagement of a shoulder on the plate with pins or projections on the disks, by which means they are brought to zero. Fig. 10 is a back view of the mechanism for registering each time the trip-register is set or brought to zero, and Fig. 11 a face view of the registering-wheel of this mechanism.

The casing A is preferably of the flat tapering form shown, as being more convenient for handling and better adapted for the reception of the mechanism as organized in the present instance, the shape shown also adapting the register to be attached to the person of the user by suitable loops, *a*, in a well-known way, without presenting a bulging or projecting obstruction inconvenient in crowded cars or vehicles.

The permanent or continuously-counting registering mechanism consists of a series of wheels, B, of well-known construction, mounted on suitable arbors, posts, or shafts in the upper end of the casing, the wheels being preferably arranged in a semicircle or concentrically, as shown. This permanent register is capable of registering an immense number of fares, the first wheel registering units, the next tens, and so on, each wheel being provided with ten teeth or notches, and at every complete revolution turning the next highest counting-wheel the distance of one tooth or one-tenth of a revolution.

The construction and operation of this class of multiplying registering mechanism are so well understood that detailed description is deemed unnecessary. The circular or concentric arrangement of the wheels, however, is advantageous, as it leaves a central space for the reception of the trip-registering mechanism hereinafter described, and thereby allows of a compact organization and arrangement of the mechanism.

The shafts of the register-wheels are extended through suitable openings in the back plate of the casing and furnished with index fingers or pointers, which, in connection with suitable dials formed upon the casing, one for each wheel and pointer, enable the register to be read off at a glance.

To prevent tampering with the pointers and mechanism, I employ a hinged cover, A', which when locked prevents access to the index. Instead, however, of employing the index-hands, suitable openings in the back of the casing may be used, which would permit of inspecting numerals on the registering-wheels.

The trip-registering mechanism consists of an actuating-wheel, C, turning with a suitable post or axle, having its bearing in the back plate of the casing, the wheel being provided with ten teeth or notches, c, in this instance.

Mounted loosely upon a projecting hub, C', of the wheel C, so as to turn freely thereon, is a toothed wheel, D, rigidly connected through an intermediate sleeve, d, with a flat disk, E, which is provided on its face, near the periphery, with numerals 1 to 9, inclusive, (a blank space being left between 9 and 1,) and constitutes the tens-disk of the register.

A second disk, F, somewhat similar to the first, and provided with the numerals 0 to 9, inclusive, is placed just over the tens-disk, being fixed upon the squared upper end of the hub C', so as to turn therewith, and constitutes the unit-disk of the register.

At every complete revolution of the unit-disk the tens-disk makes one-tenth of a revolution, whereby the trip-register, in this instance, is capable of registering ninety-nine fares, which is amply sufficient for ordinary purposes; but another disk to register hundreds may be added in well-known ways, if desired.

As the unit-disk lies directly over the tens-disk, I provide the former with slots f opposite the numerals on its face, by which to read the numerals on the face of the latter.

For convenience in reading or inspecting the trip-register, and to enable the passenger to see that his fare is properly registered, an opening or window, a', is made in the front of the casing A, and to prevent tampering with the mechanism or disks through this window it is covered with some transparent material, such as glass, as usual.

The alarm mechanism is mounted in the lower and smaller end of the casing, and consists of a bell, G, and hammer H, the arm or lever H' of which is pivoted at h, and is normally held slightly out of contact with the bell by a spring, h'.

The actuator or prime mover of both sets of registering mechanism (the permanent or continuously-counting register and the trip or temporary register) and of the alarm apparatus consists, in this instance, of a slide or push-bar, I, the upper end or neck of which moves endwise through an opening in the upper end of the casing, and is provided with a suitable finger-piece or button, i. The bar is also provided inside the casing, near its upper end, with a guide-slot, i', through which is passed a fixed headed pin or guide-screw, and at its lower end with a guide-slot, i², through which is also passed a guide-pin, whereby the steady reciprocation of the push-bar is secured.

The slide or bar I has two arms—one a short arm, I', which carries a spring-pawl, J, to actuate the unit-wheel of the permanent register by engaging with one of its ten teeth, and the other a long arm, I², which carries a spring-pawl, J', to actuate the wheel C of the trip-register by engaging one of its ten teeth c. This long arm also carries another spring-pawl, J², which engages with the short arm h² of the bell-hammer lever to raise the hammer (by rocking its lever on its pivot) a distance sufficient, when released and brought down by the action of the spring, to produce an alarm.

The three independent actuating pawl-connections which I have shown and described, one each for the two registering mechanisms and for the alarm, are pivoted or yielding pawls held to their work by springs acting thereon, and I term these said independent yielding actuating pawl-connections, "pivoted spring actuating-pawls."

Just over the pawl J', which actuates the wheel C, and on the same arbor or pin with it, is pivoted another pawl, j, adapted once at every complete revolution of the wheel C to vibrate into a notch, c', formed in its periphery in line with one of the actuating-notches c, whereby the pawl j is allowed to come in contact with one of the teeth on the wheel D, connected with and actuating the disk E, and rotate that disk one-tenth of a revolution, or the distance of one notch, in a well-known way in registering apparatus.

To render it impossible to ring the bell without operating the registering mechanism, I make use of a shifting spring detent-pawl, L, in connection with two series of ratchets formed on the edge of the long arm of the push-bar or slide, substantially as shown in reissued Letters Patent of the United States No. 6,146, dated November 24, 1874, and No. 6,929, dated February 15, 1876, granted to the Railway Register Manufacturing Company as the assignee of Joseph Corbett, in which recited Letters Patent a full description of the construction and operation of this device is set forth.

The operation of the mechanism thus far described is as follows: At every complete inward stroke of the push-bar or slide the unit-wheel of the permanent register is rotated the distance of one tooth, or one-tenth of a revolution, by the pawl J, the actuating-wheel C, and consequently the unit-disk of the trip-register, is rotated the distance of one tooth by the pawl J', and the alarm is sounded by the pawl J², the push-bar being thrown outward after every complete inward movement by a suitable spring, in a well-known way. At the tenth actuation of the unit-wheel of the permanent register a tooth thereon engages with one of the notches of the next or tens-wheel, moving it the distance of one tooth, which operation continues throughout the series of wheels, while at the tenth actuation of the unit-disk of the trip-register the pawl j (which has hitherto been kept from engagement with the actuating-wheel D of the tens-disk) vibrates into the notch c' in the actuating-wheel C of the unit-disk and engages the said toothed wheel D of the tens-disk, turning it one point, or one-tenth of a revolution, the trip-register then showing a record of ten actuations of the push-bar, and consequently that number of fares collected, while a like record or increase is shown by the permanent register.

Suitable pawls, s s', of well-known construction, are provided, which prevent back rotation of the unit-wheel of the permanent register and the actuating-wheel of the trip-register.

In order to reset the trip-register at the end of each trip, or whenever desired, or, in other words, to bring the register to zero without disturbing the integrity of the record preserved by the permanent register, so as to commence registering anew, I mount in the casing, just over the trip-registering disks, a plate, N, fixed upon one end of an axle, shaft, or arbor turning in a bearing in the front plate of the casing, and provided on its projecting end with a thumb wheel, nut, or key, N', by which to operate the plate from the outside of the casing. This plate is preferably circular in shape, with a cam edge or enlargement, n, on one side, and on the back of this enlarged or cam edge next the registering-disks E F is formed an inclined shoulder or projection, n', the abrupt side of which is adapted to engage with or abut against suitable lugs, pins, or projections e f'', respectively rising from the faces of the said disks, when said plate is turned forward in the direction indicated by the arrow in Figs. 3, 8, and 9.

The disk E is slightly enlarged or provided with a cam or extended edge, e', on one side, (corresponding to the enlargement of the plate N,) to carry its projection e, whereby the projections on the disks are permitted to be brought in line, and the two disks consequently moved round together when engaged by the projection n' of the turning plate. The said plate N is normally locked from turning by means of a spring detent or bolt, O, passing through the front plate of the casing and engaging with an opening formed at the proper point in the plate, the detent being provided outside the casing with a suitable finger piece or wheel, O', and when locked in this position an opening or window, n³, formed in the said turning plate, corresponds with that in the casing through which the register is read, and will not therefore obstruct the free inspection of said register.

The locking detent or bolt is raised or retracted when the plate N is to be turned to set or bring the trip-register forward to zero, the projection n' on the plate and those e f'' on the trip-disks being so organized that no matter in what relative positions the disks may be owing to the operation of the register, a single revolution of the plate will suffice to gather or bring them to zero, or the starting-point, at which point the windows in the plate and casing are in line, while the plate will be automatically locked from turning by its detent O.

It will be obvious that when the plate is turned to reset the register the numerals thereof will be hid from view until a complete forward revolution of the plate takes place, the plate being locked from back rotation or movement after the turning movement has commenced by a pawl, P, (hereinafter described,) which engages a suitable shoulder or teeth, n², formed in the edge of the plate. (See Figs. 3 and 10.)

The turning plate N, therefore, is not only the means for resetting the trip-disks by acting directly thereon, but it is also a covering-plate, which obscures or hides the figures on the disks from view during the resetting movements of the trip-register. As the said plate is locked from backward movement, a full forward movement of the plate, when once commenced, must be completed in order to bring the windows of the resetting-plate and casing into coincidence, so as to permit a view of the register-wheels, and this prevents fraudulent manipulation of said trip-register by the resetting mechanism, inasmuch as the conductor cannot turn the trip-disks, or either of them, in their counting direction, to suit his plans, and then return the plate with its window in position to view the indication so made, but he is compelled to continue or complete the movement and reset the disks to zero in order to save himself from exposure, which would follow from the inability of the passengers or a detective to observe the indication of the register through the window in front of the casing.

The moment the plate arrives with the trip-disks at the point indicative of zero, or no registration, it is automatically locked by the detent O, before mentioned, which prevents accidental movement of the turning plate, and the trip-disks with it, past the point from which the register is to be started in the counting operations, and also prevents accidental movement of the plate by the trip-disks as they are turned in the process of counting or tallying.

To register each movement of the turning plate, and consequently each time the trip-register is reset or brought to zero, the cam-edge of said plate and that of the disk E is terminated abruptly, so as to form a shoulder, behind which engages the short arm of a lever-pawl, P, pivoted at $p$ upon the inside of the front plate of the casing, and jointed at $p'$ to an arm or pawl, Q, engaging with a ratchet or toothed wheel, R, provided on its face with numerals adapted to be read as the wheel is rotated through a suitable opening in the front of the casing. (See Figs. 4 and 10.) A suitable spring acts upon the lever P to keep its end pressed close to the edge of the turning plate N; a suitable spring acts upon the pawl Q to keep it in engagement with the ratchet-wheel R, and a suitable pawl, $r$, prevents back rotation of the said wheel.

As the covering-plate N is turned in a forward direction (being locked from turning backward by the lever-pawl) the end of the lever-pawl P bears against its edge or periphery, and as its cam-edge $n$ is brought round in contact with the lever it (the lever) is rocked upon its pivot, raising the outer end of its long arm and elevating the pawl Q, carried thereby, the distance of one tooth on the ratchet-wheel R. As soon as the cam-edge $n$ is turned past the lever, which is at the moment the plate is automatically locked and the trip-register is at zero, the locking end of the lever is immediately forced in behind the shoulder formed at the termination of the cam-edge, causing the pawl Q, pin-jointed to its long arm, to descend, moving the registering ratchet-wheel the distance of one tooth, which operation is indicated by a new numeral or number to be inspected through the opening $a^2$ in front.

The construction, operation, and advantages of my improvements will be obvious from the foregoing description without further elaboration.

I disclaim herein in favor of my application for Letters Patent filed November 7, 1878, of which this present case is a division, all patentable subject-matter shown in the two applications which is not specifically claimed in this present one, the intent and object of this present application being to cover and include only the particular combinations of mechanism set out in the following two clauses of claim, while reserving as the subject-matter of my said application of November, 1878, all other patentable features of my improved register.

What I do claim herein as of my own invention is—

1. The combination, substantially as hereinbefore set forth, in a fare-register, of mechanism for permanently registering each fare as collected, mechanism for indicating the fares collected on each trip, alarm mechanism, and an actuator, slide, or push-bar provided with pivoted spring actuating-pawls, one for each registering mechanism and for the alarm mechanism.

2. The combination, substantially as hereinbefore set forth, of permanent or continuous registering mechanism, temporary or trip registering mechanism, alarm mechanism, an actuator, slide, or push-bar provided with pivoted spring actuating-pawls, one each for the registering mechanisms and for the alarm, and mechanism for registering each time the trip-register is brought to zero, or the starting-point.

In testimony whereof I have hereunto subscribed my name.

JOHN B. BENTON.

Witnesses:
WM. S. BEAMAN,
ANTHONY GREF, Jr.